United States Patent [19]

Lewis et al.

[11] Patent Number: 5,074,516
[45] Date of Patent: Dec. 24, 1991

[54] APPARATUS FOR ROTATABLE ATTACHMENT OF AN INSTRUMENT WITH RESPECT TO ENVIRONMENTAL STRUCTURE

[75] Inventors: Michael Lewis, Cherry Hill; Joe Grato, Hamilton Township, Mercer County, both of N.J.

[73] Assignee: Franklin Machine Products, Inc., Marlton, N.J.

[21] Appl. No.: 628,556

[22] Filed: Dec. 17, 1990

[51] Int. Cl.⁵ .............................................. G01K 1/14
[52] U.S. Cl. .................................. 248/691; 248/692; 248/340; 374/194
[58] Field of Search .................... 248/340, 690-692, 248/214, 215; 374/194, 208

[56] References Cited

U.S. PATENT DOCUMENTS

| 172,030 | 1/1876 | Jourde . | |
| 645,371 | 3/1900 | Nourse . | |
| 1,886,042 | 11/1932 | Osborne . | |
| 1,995,470 | 3/1935 | Chaney | 248/691 X |
| 2,021,697 | 11/1935 | Neuwirth | 374/194 |
| 2,114,071 | 4/1938 | Chaney et al. | 374/194 |
| 2,117,942 | 5/1938 | Chaney | 374/194 X |
| 2,169,904 | 8/1939 | Schweller . | |
| 2,283,248 | 5/1942 | Frese . | |
| 2,556,394 | 6/1951 | Jackson | 374/194 |
| 2,563,749 | 8/1951 | Rose et al. . | |
| 2,658,968 | 11/1953 | Janos . | |
| 3,321,068 | 5/1967 | Beach . | |
| 3,495,697 | 2/1970 | Catelli . | |
| 3,707,851 | 1/1973 | McAshan, Jr. . | |
| 4,659,236 | 4/1987 | Hobbs . | |
| 4,669,892 | 6/1987 | Greenwood . | |
| 4,998,700 | 3/1991 | McKaig | 248/214 |

FOREIGN PATENT DOCUMENTS 653376  10/1964  Belgium .............................. 248/692

Primary Examiner—Alvin C. Chin-Shue
Attorney, Agent, or Firm—Sperry, Zoda & Kane

[57] ABSTRACT

An apparatus for rotatable securement of an instrument such as a thermometer particularly usable for attachment with respect to a refrigerated environment including a bracket adapted to be fixedly secured with respect to a vertically extending wall within the refrigerated environment or adapted to be positioned suspended from conventional rod-like portions of shelving positioned therein. An instrument housing means particularly adaptable for housing of a thermometer is rotatably mounted with respect to the lower portion of the bracket member in such a manner as to allow complete rotation of the housing with respect to the bracket when the bracket is secured with respect to a vertically extending wall without contact with the environmental structure. This configuration is achieved by sizing of the distance of the bracket between the pivot point and the rear wall attachment area thereof to be greater than the distance between the pivot point and the outermost dimension of the instrument housing.

17 Claims, 2 Drawing Sheets

APPARATUS FOR ROTATABLE ATTACHMENT OF AN INSTRUMENT WITH RESPECT TO ENVIRONMENTAL STRUCTURE

BACKGROUND OF THE INVENTION

1. Field Of The Invention

The present invention deals with the field of devices useful for securement of a thermometer with respect to a pre-chosen environment such as a refrigerated cabinet in more than one different manner of attachment. The bracket of the present invention includes a housing which is rotatably movable with respect to the bracket to facilitate orientation of the instrument such as a thermometer in various angular relationships with respect to the environmental structure to facilitate viewing thereof.

Also multiple means of mounting of the instrument with respect to the refrigerated environment is achieved by a novel bracket structure capable of being fixedly secured with respect to a vertically extending wall or suspended from horizontally extending rods with a single bracket configuration. The housing of the present invention can be transparent to facilitate viewing of the instrument and the instrument can have an access opening to facilitate removal and replacement of one instrument with another instrument as desired.

2. Description Of The Prior Art

Other patents have been granted dealing with similar problems to the problems addressed by the present invention and examples of these patents are as shown in U.S. Pat. No. 172,030 patented Jan. 11, 1876 to A. Jourde on a Heat-Indicator For Stoves; U.S. Pat. No. 645,371 patented Mar. 13, 1900 to R. Nourse on an Oven Thermometer; U.S. Pat. No. 1,886,042 patented Nov. 1, 1932 to F. Osborne on a Refrigerator; U.S. Pat. No. 2,169,904 patented Aug. 15, 1939 to E. Schweller on a Thermometer Bracket; U.S. Pat. No. 2,283,248 patented May 19, 1942 to A. Frese on a Thermometer Holder; U.S. Pat. No. 2,563,749 patented Aug. 7, 1951 to A. Rose et al on an Instrument With Hanger; U.S. Pat. No. 2,658,968 patented Nov. 10, 1953 to A. Janos on a Combined Illumination And Minimum Temperature Control For Refrigerators; U.S. Pat. No. 3,321,068 patented May 23, 1967 to J. Beach on a Thermometer Set; U.S. Pat. No. 3,495,697 patented Feb. 17, 1970 to P. Catelli on a Revolving Case For Clinic Thermometers For Zero Setting The Scale Thereof; U.S. Pat. No. 3,707,851 patented Jan. 2, 1973 to R. McAshan, Jr. on a Refrigeration System Efficiency Monitor; U.S. Pat. No. 4,659,236 patented Apr. 21, 1987 to M. Hobbs on a Flush Mounted Temperature Sensor; and U.S. Pat. No. 4,669,892 patented June 2, 1987 to V. Greenwood on a Thermometer Mounting Device.

SUMMARY OF THE INVENTION

The present invention provides an apparatus for rotatable attachment of a temperature measuring instrument with respect to environmental structure wherein a bracket is preferably formed of a flexibly resilient material in such a manner as to be generally C-shaped. This bracket is adapted to be attached by at least two different manners with respect to environmental structure such as a refrigerated environment.

The bracket particularly includes a rear section which includes a securement aperture extending therethrough to facilitate fastening of the rear section with respect to environmental structure such as a refrigerated environment. This aperture is particularly usable by the placement of a screw means extending therethrough to fixedly secure the secure the rear section of the bracket with respect to a vertically extending wall within a refrigerated environment.

The bracket may also include a top section preferably formed integral with respect to the rear section and extending generally outwardly and horizontally forward therefrom. Also the bracket may further include a bottom section also being integral with respect to the rear section and the top section and extending outwardly from the lower area of the rear section in a horizontally forwardly extending direction. This bottom section may define a pivot point thereon positioned at a pre-specified defined distance from the rear section. This bottom section of the bracket section may also include a tab member positioned at this pivot point and protruding outwardly downwardly therefrom.

The bracket preferably includes a front section integral with respect to the top section and the bottom section and extending vertically from each section in such a manner as to define a slot extending laterally completely therethrough. The slot is adapted to receive any longitudinally extending environmental structure such as a rod member of a shelf of a refrigerated case to facilitate mounting of the bracket means with respect thereto. The slot preferably also includes a widened area centrally located therein to facilitate access to the securement aperture located within the rear section such that a screw and screw driver can be placed through the slot and into the securement aperture to fixedly secure the rear section with respect to a vertically extending wall as desired.

The apparatus of the present invention further includes an instrument retainment device pivotally attached with respect to the bracket. This retainment device preferably includes an instrument housing adapted to receive an instrument such as a thermometer positioned therein for measurement of environmental conditions such as temperature. This instrument housing particularly includes preferably a tubular housing which is transparent to facilitate visibility of an instrument positioned therein. The tubular housing may be completely transparent or at least may define a transparent wall area thereof. The tubular housing also defines an upper opening therein and a lower opening therein to facilitate removal and replacement of an instrument positioned therein.

The instrument housing preferably further includes a lower cap extendable over the lower opening and removable to further facilitate removal and replacement of an instrument retained therein. Furthermore the instrument housing may include an upper cap extendable over the upper opening and removable to facilitate removal and replacement of an instrument retained therein. The upper cap may define a rotation aperture therein adapted to receive the tab member protruding downwardly therethrough from the bracket member to facilitate rotational movement of the instrument retainment device with respect to the bracket. Here the distance between the tab member and the most distant portion of the instrument housing is less than the defined distance between the rear section of the bracket and the tab means to facilitate completely freedom of rotational movement of the instrument housing with respect to the bracket and with respect to the environmental structure to which the bracket is secured.

It is an object of the present invention to provide an apparatus for rotatable attachment of an instrument with respect to environmental structure wherein maintenance requirements are minimized.

It is an object of the present invention to provide an apparatus for rotatable attachment of an instrument with respect to environmental structure wherein initial capital outlay for equipment is minimized.

It is an object of the present invention to provide an apparatus for rotatable attachment of an instrument with respect to environmental structure wherein down time is minimized.

It is an object of the present invention to provide an apparatus for rotatable attachment of an instrument with respect to environmental structure wherein cost of manufacturing and marketing is minimized.

It is an object of the present invention to provide an apparatus for rotatable attachment of an instrument with respect to environmental structure wherein visibility from varying angles of an instrument retained thereby is made possible.

It is an object of the present invention to provide an apparatus for rotatable attachment of an instrument with respect to environmental structure wherein mounting with respect to a refrigerated environment can be achieved with more than one mounting means.

It is an object of the present invention to provide an apparatus for rotatable attachment of an instrument with respect to environmental structure wherein various different types of instruments can be retained within an instrument housing.

It is an object of the present invention to provide an apparatus for rotatable attachment of an instrument with respect to environmental structure wherein complete freedom of rotational movement of the instrument housing with respect to the mounting bracket and the environmental structure is achieved.

It is an object of the present invention to provide an apparatus for rotatable attachment of an instrument with respect to environmental structure wherein the materials of the bracket and the housing are formed of a flexibly resilient material to facilitate longevity of usage and enhance mounting characteristics.

It is an object of the present invention to provide an apparatus for rotatable attachment of an instrument with respect to environmental structure wherein access to the instrument retained within the housing can be provided without removal of securement of the bracket with respect to the environmental structure.

It is an object of the present invention to provide an apparatus for rotatable attachment of an instrument with respect to environmental structure wherein mounting with respect to the vertically extending wall is facilitated.

It is an object of the present invention to provide an apparatus for rotatable attachment of an instrument with respect to environmental structure wherein mounting with respect to conventional shelving such as horizontally extending rod members is facilitated.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

DETAILED DESCRIPTION OF THE PREFERRED EMBODIMENT

Figures 1, 2:
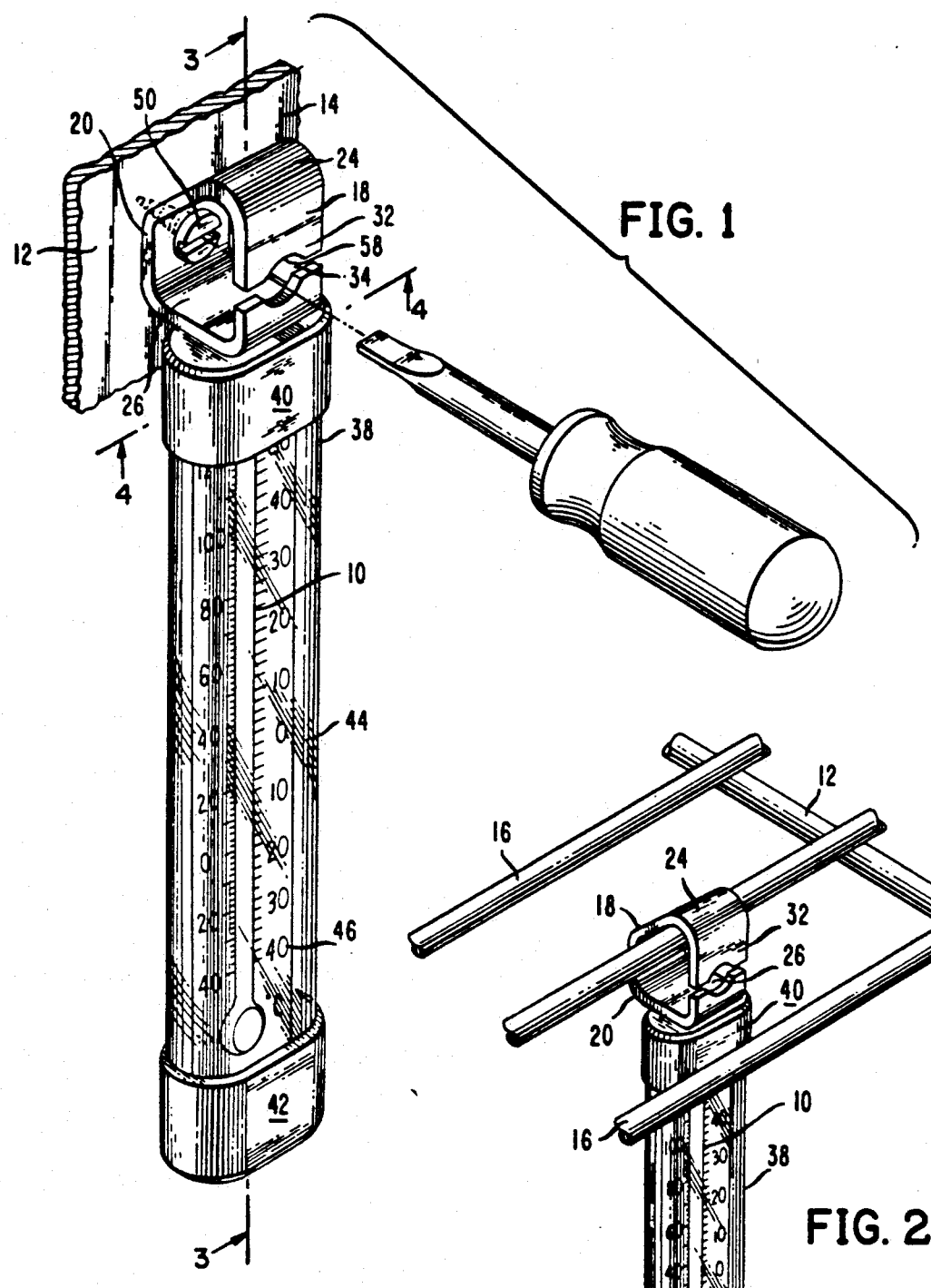
FIG. 1 is a perspective illustration of an embodiment of the apparatus of the present invention shown mounted with respect to a vertically extending rear wall environmental configuration.
FIG. 2 is a perspective illustration of an embodiment of the apparatus of the present invention shown mounted with respect to rod shelving.
Figure 3:
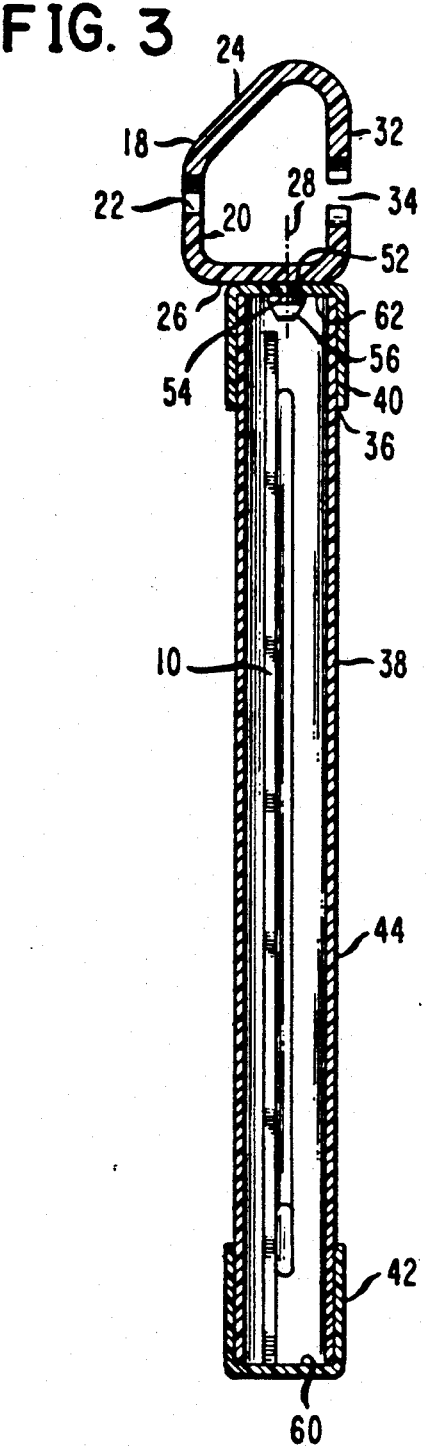
FIG. 3 is a cross-sectional view of the embodiment shown in FIG. 1 along lines 3—3.

The present invention provides an apparatus for rotatable attachment of an instrument 10 such as a thermometer with respect to the environmental structure 12 such as a refrigerated holding case. Such cases conventionally include vertical walls 14 as well as shelves including various horizontally extending rod members 16.

The present invention provides a novel apparatus including a bracket 18 adapted for securement with respect to the rod member 16 or the vertical wall 14 as desired by the end user. In particular the bracket 18 includes a rear section 20 adapted to be fixedly secured with respect to a vertical wall 14. This securement is made possible by a securement aperture 22 which is defined within the rear section 20 adapted to receive a screw means 50 extending therethrough for fixed securement of the bracket 18 with respect to the vertically extending wall 14. Bracket 18 may also include a top section 24 extending horizontally outward from the upper portion thereof. Similarly a bottom section 26 may be included extending horizontally outward from the lower portion of the rear section 20.

Bottom section 26 preferably also includes a pivot point 28 thereon at a specific defined distance 30 from the point of securement of the rear section 20 of bracket member 18 with respect to the vertical wall 14. This defined distance is predetermined.

The bracket member 18 also includes a front section 32 extending preferably generally vertically such as to define a horizontally extending slot member 34. The horizontally extending slot preferably extends through the entire front section 32 from one side to the other in this horizontally extending direction.

The apparatus of the present invention further includes an instrument retainment device 36 adapted to hold an instrument 10 such as a thermometer preferably for measurement of environmental conditions within structure 12. Normally the instrument will comprise a thermometer. The instrument retainment means 36 includes a specific instrument housing 38 adapted to directly house the instrument 10. In its preferred configuration the instrument housing 38 includes an upper cap means 40 and a lower cap means 42 each extending over opposite open ends of a tubular housing 44. Preferably the tubular housing 44 defines an upper opening 62 over which the upper cap means 40 detachably extends. In a similar manner the tubular housing 44 may define a lower opening 60. The lower cap device 42 is adapted to be detachably securable in position extending in a similar manner over the lower opening 60. The manner of securement is preferably identical to the manner of securement of the upper cap means 40 over the upper opening 62. With this configuration preferably the tubular housing 44 will define a transparent wall area 46 therealong to facilitate viewing of the readings of the instrument positioned therein. Preferably the tubular housing 44 can itself be formed of a transparent plastic to facilitate viewing.

Figure 4:
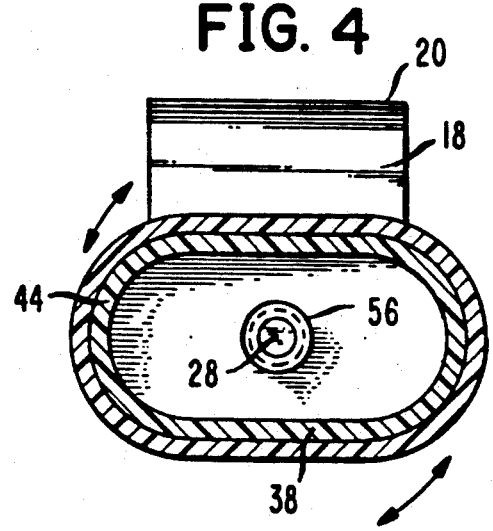
FIG. 4 is a cross-sectional view of the embodiment shown in FIG. 1 along lines 4—4.
Figure 5:
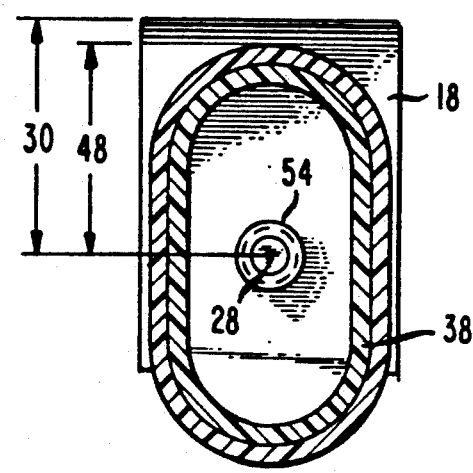
FIG. 5 is an illustration of the embodiment shown in FIG. 4 with the instrument housing rotated ninety (90) degrees with respect to the orientation shown in FIG. 4.

A rotatable attachment means 52 is secured with respect to the upper portion of the instrument retainment means 36. Preferably this rotatable attachment means comprises a rotation aperture 54 defined in the upper cap member 40 in combination with a tab member 56 protruding downwardly from the bottom section 26. Tab member 56 is preferably located at the pivot point 28 defined on bottom section 56 and extends downwardly therefrom through the rotation aperture 54 defined in the upper cap means 40 of instrument housing 38. With this configuration rotation of the instrument housing 38 with respect to the bracket 18 is facilitated. The previously described defined distance 30 is the distance between the pivot point 28 and the rear section 20 of bracket 18. The rotation distance 48 is the distance between the rotation aperture 54 of upper cap 40 and the outermost part of the instrument housing 38. This rotation distance 48 must be less than the defined distance 30 as particularly shown in FIGS. 4 and 5 to allow complete rotational movement of the housing 38 with respect to the bracket 18 whenever the rear section 20 of the bracket 18 is fixedly mounted with respect to a vertically extending environmental structure as shown in FIG. 1. Thus as shown specifically in FIG. 5 rotation distance 48 must be always be greater than defined distance 30. With this dimensional difference it is then possible to orient the instrument housing 38 with complete 360 degree freedom of movement with respect to the environmental structure. This allows orientation of the readings of the instrument 10 in any pre-chosen direction as desired. This has been shown to be a problem in pre-existing instruments wherein this flexibility of orientation was not provided thereby limiting the utility of the instrument mounting bracket apparatus.

To facilitate mounting of the apparatus of the present invention by extending the screw member 50 through the rear securement aperture 22 preferably the slot 34 will include a widened area 58 defined therein such that a screwdriver or other instrument as shown in FIG. 1 can extend through the slot to secure the rear section 20 with respect to a vertically extending environmental wall area 14.

Thus, as seen in FIGS. 1 and 2, the present invention provides an apparatus for mounting of an instrument 10 in at least two variable manners wherein with reach method of mounting the housing for the instrument itself is capable of complete 360 degree rotational movement. This normally is not a problem when the mounting of the bracket is with respect to the horizontally extending rod member 16 as shown in FIG. 2. However this has been shown to be a problem when the mounting is utilized as shown in FIG. 1 with the vertically extending wall area 14. Thus the present invention provides multiplicity of manners of mounting as well as complete variability in the angular orientation of the face of an instrument retained within the instrument retainment means 36.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. An apparatus for rotatable attachment of an instrument with respect to environmental structure comprising:
   a) a bracket means being capable of attachment with respect to environmental structure, said bracket means further comprising:
      (1) a rear section defining a securement aperture therein to facilitate fastening thereof with respect to environmental structure;
      (2) a top section attached with respect to the upper area of said rear section and extending outwardly and forwardly therefrom;
      (3) a bottom section attached with respect to the lower area of said rear section and extending outwardly and forwardly therefrom, said bottom section defining a pivot point thereon positioned at a defined distance from said rear section;
      (4) a front section attached with respect to said top section and said bottom section and defining a slot extending laterally therealong, said slot defining a widened area centrally located therealong to facilitate access to said securement aperture located within said rear section, said slot adapted to receive any longitudinally extending environmental structure to facilitate mounting of said bracket means with respect thereto;
   b) an instrument retainment means pivotally attached with respect to said bracket means and comprising:
      (1) an instrument housing means adapted to receive an instrument positioned therein for measuring environmental conditions, said instrument housing means including a transparent wall area to facilitate monitoring of an instrument located therewithin; and
      (2) a rotatable attachment means attached to said instrument housing means and being rotatably attached with respect to said bracket means at said pivot point defined thereon wherein the distance between said rotatable attachment means and the most distant portion of said instrument housing means is less than the defined distance between said rear section of said bracket means and said pivot point defined thereon to facilitate complete freedom of rotational movement of said instrument housing means with respect to said bracket means and with respect to environmental structure to which said bracket means is secured.

2. An apparatus for rotatable attachment of an instrument with respect to environmental structure as defined in claim 1 wherein said bracket means is generally C-shaped.

3. An apparatus for rotatable attachment of an instrument with respect to environmental structure as defined in claim 1 further comprising a screw means adapted to be positioned extending through said securement aperture defined in said rear section of said bracket means to facilitate securement thereof with respect to environmental structure.

4. An apparatus for rotatable attachment of an instrument with respect to environmental structure as defined in claim 1 wherein said bracket means is formed of flexibly resilient material to allow resilient expanding of said slot means to facilitate receiving of longitudinally extending environmental structure therethrough.

5. An apparatus for rotatable attachment of an instrument with respect to environmental structure as defined in claim 1 wherein said instrument housing means defines a rotation aperture therein and wherein said bottom section of said bracket means includes a tab member protruding downwardly therefrom through said rotation aperture to facilitate rotational movement of said instrument retainment means with respect to said bracket means, said tab member being positioned at said pivot point.

6. An apparatus for rotatable attachment of an instrument with respect to environmental structure as defined in claim 1 wherein said instrument housing means includes a lower cap means being removable to facilitate removal and replacement of the instrument retained therein.

7. An apparatus for rotatable attachment of an instrument with respect to environmental structure as defined in claim wherein said instrument housing means further comprises:
   a) a tubular housing means being transparent to facilitate visibility of an instrument positioned therein, said tubular housing means defining an upper opening therein and a lower opening therein;
   b) a lower cap means extendable over said lower opening and being removable to facilitate removal and replacement of the instrument retained therein; and
   c) an upper cap means extendable over said upper opening and being removable to facilitate removal and replacement of the instrument retained therein.

8. An apparatus for rotatable attachment of an instrument with respect to environmental structure as defined in claim 7 wherein said upper cap means defines a rotation aperture therein and wherein said bottom section of said bracket means includes a tab member protruding downwardly therefrom through said rotation aperture to facilitate rotational movement of said instrument retainment means with respect to said bracket means, said tab member being positioned at said pivot point.

9. An apparatus for rotatable attachment of an instrument with respect to environmental structure as defined in claim 1 wherein the instrument positioned within said instrument retainment means is operable to sense temperature conditions.

10. An apparatus for rotatable attachment of an instrument with respect to environmental structure as defined in claim 1 wherein said top section extends generally horizontally forwardly with respect to said rear section of said bracket means.

11. An apparatus for rotatable attachment of an instrument with respect to environmental structure as defined in claim 1 wherein said bottom section extends generally horizontally forwardly with respect to said rear section of said bracket means.

12. An apparatus for rotatable attachment of an instrument with respect to environmental structure as defined in claim 1 wherein said front section extends generally vertically with respect to said top section and said bottom section.

13. An apparatus for rotatable attachment of an instrument with respect to environmental structure as defined in claim 1 wherein said slot extends completely through said front section in a horizontally extending direction.

14. An apparatus for rotatable attachment of an instrument with respect to environmental structure as defined in claim 1 wherein said rear section and said top section are integral with respect to one another.

15. An apparatus for rotatable attachment of an instrument with respect to environmental structure as defined in claim 1 wherein said rear section and said bottom section are integral with respect to one another.

16. An apparatus for rotatable attachment of an instrument with respect to environmental structure as defined in claim 1 wherein said rear section, said top section, said bottom section and said front section are integral with respect to one another.

17. An improved apparatus for rotatable attachment of a temperature measuring instrument with respect to a refrigerated environmental structure including shelves having horizontally extending rod elements and a vertically extending wall area wherein the improvement comprises:
  a) a bracket means of flexibly resilient material being generally C-shaped and being capable of attachment with respect to vertically extending wall areas and rod elements, said bracket means further comprising:
    (1) a rear section defining a securement aperture therein to facilitate fastening thereof with respect to vertically extending wall areas;
    (2) a top section integral with respect to said rear section and attached with respect to the upper area of said rear section and extending outwardly and horizontally forwardly therefrom;
    (3) a bottom section integral with respect to said rear section and attached with respect to the lower area of said rear section and extending outwardly and horizontally forwardly therefrom, said bottom section defining a pivot point thereon positioned at a defined distance from said rear section, said bottom section of said bracket means includes a tab member positioned at said pivot point and protruding downwardly therefrom;
    (4) a front section integral with respect to said top section and said bottom section and attached with respect to said top section and said bottom section and defining a slot extending laterally completely therethrough, said slot adapted to receive the rod element therethrough to facilitate mounting of said bracket means with respect thereto, said slot defining a widened area centrally located therein to facilitate access to said securement aperture located within said rear section;
  b) an instrument retainment means pivotally attached with respect to said bracket means and comprising:
    (1) an instrument housing means adapted to receive a temperature measuring instrument positioned therein for measuring environmental conditions, said instrument housing means further including:
      (a) a tubular housing means being transparent to facilitate visibility of the temperature measuring instrument positioned therein, said tubular housing means defining an upper opening therein and a lower opening therein;
      (b) a lower cap means extendable over said lower opening and being removable to facilitate removal and replacement of the temperature measuring instrument retained therein;

(c) an upper cap means extendable over said upper opening and being removable to facilitate removal and replacement of the temperature measuring instrument retained therein, said upper cap means defining a rotation aperture therein adapted to receive said tab member protruding downwardly therethrough to facilitate rotational movement of said instrument retainment means with respect to said bracket means wherein the distance between said tab member and the most distant portion of said instrument housing means is less than the defined distance between said rear section of said bracket means and said tab means to facilitate complete freedom of rotational movement of said instrument housing means with respect to said bracket means and with respect to a vertically extending wall area to which said bracket means is secured; and c) a screw means adapted to be positioned extending through said securement aperture defined in said rear section of said bracket means to facilitate securement thereof with respect to vertically extending wall area.

* * * * *

UNITED STATES PATENT AND TRADEMARK OFFICE
CERTIFICATE OF CORRECTION

PATENT NO.   : 5,074,516
DATED        : December 24, 1991
INVENTOR(S)  : Michael Lewis and Joe Grato It is certified that error appears in the above-identified patent and that said Letters Patent is hereby corrected as shown below:

Claim 7 (column 7, line 22) after "claim" insert -- 1 --.

Signed and Sealed this

Thirtieth Day of March, 1993

*Attest:*

STEPHEN G. KUNIN

*Attesting Officer*     *Acting Commissioner of Patents and Trademarks*